(12) United States Patent
Lindsey

(10) Patent No.: US 7,282,875 B2
(45) Date of Patent: Oct. 16, 2007

(54) SYSTEM AND METHOD FOR ELECTRIC MOTOR CONTROL

(75) Inventor: Robert Wayne Lindsey, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 11/214,938

(22) Filed: Aug. 31, 2005

(65) Prior Publication Data

US 2007/0046222 A1    Mar. 1, 2007

(51) Int. Cl.
*H02K 21/00* (2006.01)

(52) U.S. Cl. ............... 318/254; 318/823; 318/721; 62/505; 62/508

(58) Field of Classification Search ............... None
See application file for complete search history.

(56) References Cited

U.S. PATENT DOCUMENTS

| | | |
|---|---|---|
| 4,055,106 A | 10/1977 | Frey |
| 4,194,178 A | 3/1980 | Dumbeck |
| 4,639,714 A | 1/1987 | Crowe |
| 4,955,790 A | 9/1990 | Nakanishi et al. |
| 4,998,865 A | 3/1991 | Nakanishi et al. |
| 5,120,201 A | 6/1992 | Tuckey et al. |
| 5,307,894 A | 5/1994 | Henein et al. |
| 5,670,931 A | 9/1997 | Besser et al. |
| 5,810,568 A | 9/1998 | Whitefield et al. |
| 5,908,286 A | 6/1999 | Clemmons |
| 5,997,261 A | 12/1999 | Kershaw et al. |
| 6,112,525 A * | 9/2000 | Yoshida et al. ............... 62/3.7 |
| 6,158,975 A | 12/2000 | Dill et al. |
| 6,450,786 B1 | 9/2002 | Koch et al. |
| 6,624,606 B2 * | 9/2003 | Kushida et al. ............. 318/599 |
| 6,702,555 B2 | 3/2004 | Allen et al. |
| 6,901,212 B2 * | 5/2005 | Masino ....................... 318/254 |
| 2002/0014870 A1 * | 2/2002 | Krotsch et al. ............. 318/254 |

FOREIGN PATENT DOCUMENTS

GB    2348349    9/2000

OTHER PUBLICATIONS

Coakley and Kavanagh, "Real-Time Control of a Servosystem using the Inverter-Fed Power Lines to Communicate Sensor Feedback". IEEE Transactions on Industrial Electronics, vol. 46, #2, Apr. 1999. XP011023490, ISSN: 0278-0046.

* cited by examiner

*Primary Examiner*—Lincoln Donovan
*Assistant Examiner*—Renata McCloud
(74) *Attorney, Agent, or Firm*—Finnegan, Henderson, Farabow, Garrett & Dunn

(57) ABSTRACT

An electric motor control system includes a housing and a motor disposed within the housing. The electric motor control system also includes an actuator operatively coupled to the motor and configured to operate in response to an operation of the motor. The electric motor control system further includes a controller disposed within the housing and communicatively coupled to the motor. The electric motor control system also includes a first electric conductor communicatively coupling the motor to the controller, wherein the controller is configured to supply power to and communicate a data signal with the motor over the first electric conductor.

24 Claims, 2 Drawing Sheets

SYSTEM AND METHOD FOR ELECTRIC MOTOR CONTROL

TECHNICAL FIELD

This disclosure relates generally to a control system and method and, more particularly, to a system and method for controlling an electric motor.

BACKGROUND

Cooling systems typically circulate a cooling medium to provide heat dissipation for a variety of industrial systems. These cooling systems may include a pump driven by a motor and a controller for regulating one or more operational aspects of the motor. Typically, the controller includes a plurality of wires to provide power and communication between the pump, motor, and controller. This plurality of wires may increase the complexity and cost of the cooling system and decrease cooling system reliability. In addition, the spatial requirements of a cooling system having separate motor, pump, and controller units may decrease design flexibility.

One attempt to design a simpler, more compact cooling system is described in U.S. Pat. No. 6,702,555 ("the '555 patent"), issued to Allen et al. on Mar. 9, 2004. The '555 patent describes a fluid pump, an electric motor, and a circuit board disposed within a common housing. Power and communication signals are provided to the motor through stud terminals located on the housing of the fluid pump. This integrated approach of including a motor, pump, and electric circuitry into a common housing creates a compact arrangement, and the stud terminals may simplify external wiring.

Although the system of the '555 patent may be compact and externally simple, it may still be internally complex, expensive, and lack reliability. For example, the circuit board may still use multiple wires to interconnect the motor, pump, and controller. These multiple wires may increase cost and decrease reliability of the cooling system. Furthermore, the system of the '555 patent may use one or more stud terminals for providing multiple connections through the fluid pump housing wall to supply power and communication to the motor. These multiple connections may increase the likelihood of leakage of fluid through the pump housing wall.

The presently disclosed electric motor control system and method are directed to overcoming one or more of the problems set forth above.

SUMMARY OF THE INVENTION

In accordance with one aspect, the present disclosure is directed toward an electric motor control system. The electric motor control system may include a housing and a motor disposed within the housing. The electric motor control system may also include an actuator operatively coupled to the motor and configured to operate in response to an operation of the motor. The electric motor control system may further include a controller disposed within the housing and communicatively coupled to the motor. The electric motor control system may also include a first electric conductor communicatively coupling the motor to the controller, wherein the controller is configured to supply power to and communicate a data signal with the motor over the first electric conductor.

According to another aspect, the present disclosure is directed toward a method for operating a motor. The method may include providing an electric power signal to the motor over a first electric conductor. The method may also include directing a control signal from a controller to the motor over the first electric conductor.

DETAILED DESCRIPTION

Figure 1:
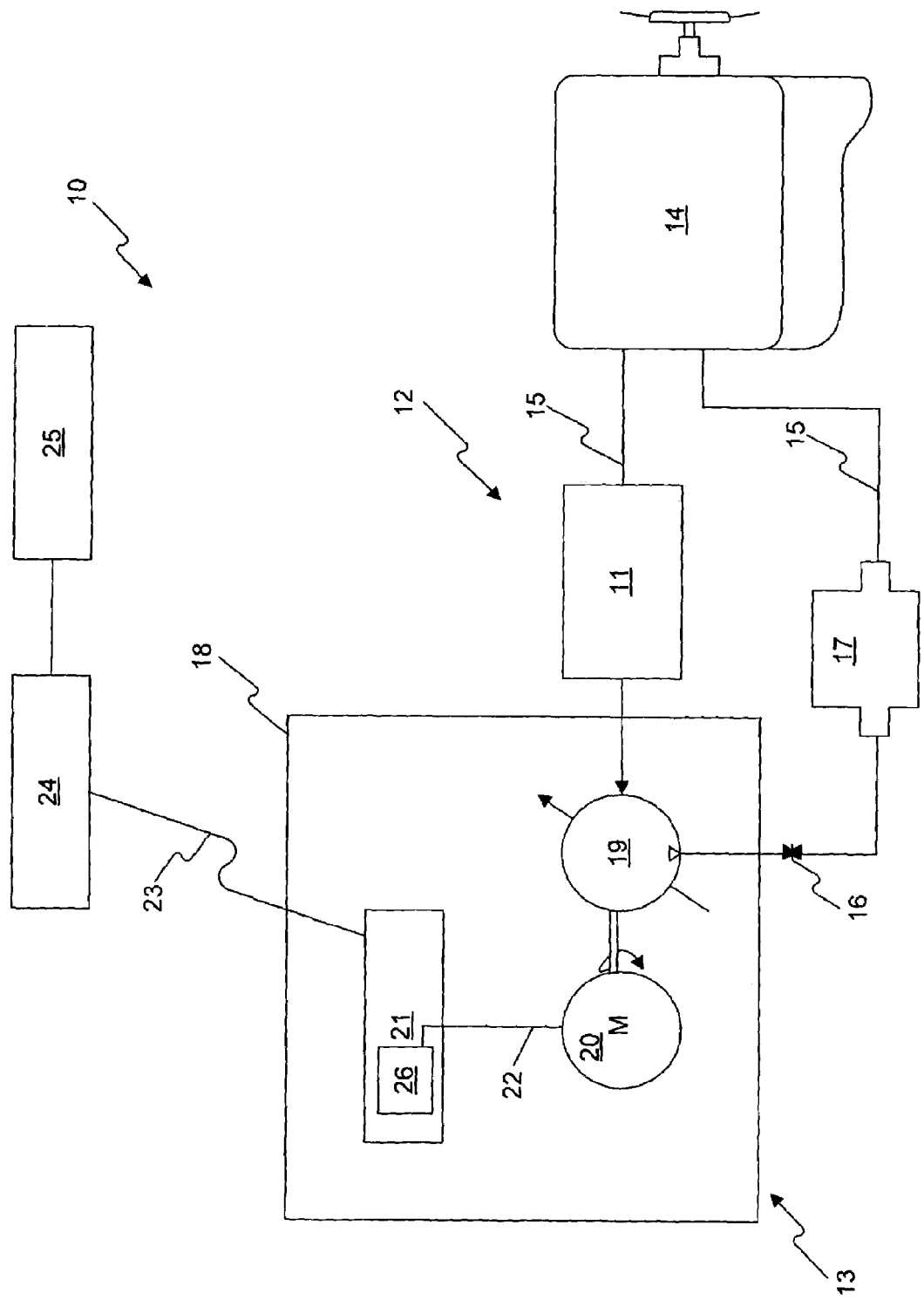
FIG. 1 is a diagrammatic illustration of an exemplary disclosed cooling system.

FIG. 1 illustrates an exemplary cooling system 10. Cooling system 10 may include components that cooperate to circulate a cooling medium through a work system for regulating a temperature of the work system. For example, cooling system 10 may include a tank 11 configured to hold a supply of cooling medium. Cooling system 10 may also include one or more cooling circuits 12 and an electric motor control system 13. While cooling system 10 is illustrated as a fluid system for cooling an internal combustion engine 14, it is contemplated that cooling system 10 may include other types of cooling systems such as, for example, a jetted air system (not shown), an oil system (not shown), a gel-based system, a pressurized gas system, or any other type of cooling system. Furthermore, cooling system 10 may be configured to cool various equipment systems such as, personal computers, vehicle transmissions, batteries, fuel cells, or any such system that may generate heat.

The cooling medium of cooling system 10 may include any material that may be adapted to absorb heat from one or more components along a flow path of cooling system 10. For example, the cooling medium may include, water, ethylene glycol-based coolant, petroleum-based lubricating oil, synthetic oil, silica-based gel, air, gaseous coolant, or any other appropriate material for absorbing and/or dissipating heat.

Cooling circuit 12 may include components for directing the flow of the cooling medium throughout cooling system 10 and near one or more heat-generating components to extract heat from the components. In particular, cooling circuit 12 may include one or more fluid transport lines 15 and/or one or more valves 16 configured to control the flow rate and path of the cooling medium. Although cooling circuit 12 is illustrated as being associated with a single component system (i.e. internal combustion engine 14), it is contemplated that cooling circuit 12 may have multiple flow paths for cooling additional components and/or component systems. For example, cooling circuit 12 may be further coupled to a heat exchanger 17, a radiator, an air conditioning system, or any other device that may include a circulating cooling medium.

Valve 16 may be operated to modify the flow rate of fluid throughout cooling system 10. For example, if one or more components in the flow path of a main artery of cooling circuit 12 requires increased flow rate of cooling medium, one or more valves 16 may be closed to limit the flow of cooling medium to a non-critical component of cooling circuit 12. It is contemplated that valve 16 may be manually operated or electrically actuated.

Heat exchanger 17 may be disposed within the flow path of cooling circuit 12 and may include one or more devices configured to transfer heat from one fluid to another. For example, heat exchanger 17 may include an air cooled radiator for an automobile cooling system wherein high temperature coolant is passed through a variety of coils that are cooled by the circulation of air flowing between and around the coils. It is also contemplated that heat exchanger 17 may embody another type of heat exchanger such as, for example, a shell and tub heat exchanger, a plate-type heat exchanger, an evaporative type heat exchanger, or any other appropriate heat exchange device.

Electric motor control system 13 may include components that function to monitor and operationally control one or more aspects of cooling system 10. For example, electric motor control system 13 may monitor and control the power supplied to one or more components of cooling system 10, the pressurization of the cooling medium, the flow rate of the cooling medium through cooling system 10, the temperature of the cooling medium, and/or any other operational aspect of cooling system. Electric motor control system 13 may include, among other things, a housing 18, a actuator 19, a motor 20, a controller 21, a first electric conductor 22 and, optionally, a second electric conductor 23.

Housing 18 may contain one or more components of cooling system 10 and may be configured to isolate the components of cooling system 10 from the surrounding environment. Housing 18 may also provide one or more flow paths for the cooling medium. Housing 18 may be constructed from various materials such as, for example, a polymer, aluminum, an alloy metal, steel, PVC, rubber, or any other suitable material.

Motor 20 may be disposed within housing 18 and configured to provide mechanical force for moving actuator 19. For example, motor 20 may include a brushless DC motor that may be coupled to an impeller to provide rotational force for pressurizing the cooling medium. Furthermore, it is also contemplated that motor 20 may include any appropriate motor for providing mechanical energy output such as, an AC induction motor, a universal motor, a linear motor, a pulse drive, or any other type of device capable of moving actuator 19.

Motor 20 may include a stator, a rotor separated from the stator by an air gap, and one or more electric conductors associated with the stator. In one embodiment, the rotor may include a permanent magnet, an iron core or copper core, or any other metallic material with high magnetic permeability configured to rotate relative to the stator in the in the presence of a variable electric field. A variable electric field may be provided by passing current through one or more field conductors associated with the stator.

Motor 20 may include one or more electric drive circuits for controlling the current flowing through the field conductors, based on a desired speed or torque of the rotor. In one embodiment, electric drive circuits may include one or more electric switches which, when operated, may provide current to the one or more field conductors. Based on the switch duration and timing sequence of the switching operation, the instantaneous current in the field conductors may produce a predictable time-varying electromagnetic field for moving the rotor. The one or more electric drive circuits may be operable to provide direct current power signals or alternating current power signals. Furthermore, because the one or more electric drive circuits may contain one or more switching elements, it is contemplated that alternating current power signals may be broken into discrete segments of varying direct current power signals.

Actuator 19 may be operatively coupled to motor 20 and may include one or more devices configured to operate in response to an operation of motor 20. Actuator 19 may include any mechanical device that may be configured to move based on an operation of a motor such as, for example, a fan blade, a vibrating mechanism, a piston, a shaft arm, a pressurization device for circulating a cooling medium, or any other such mechanical device. For example, in one embodiment, actuator 19 may include an impeller coupled to a shaft that, when rotated, is configured to circulate a cooling medium through cooling system 10. It is further contemplated that actuator 19 may include other devices for pressurizing a cooling medium, such as a piston housed in a pumping chamber, a gear displacement system, a rotating blade, a pressurization jet, or any other such device.

Controller 21 may include components configured to operate and control one or more operational aspects of motor 20. For example, controller 21 may be configured to provide power signals, electric drive functionality, electronic switching, speed control, or any other operational or control function of motor 20. Controller 21 may include various components (not shown) for running software applications. For example, controller 21 may include a central processing unit (CPU) (not shown), a computer-readable memory (not shown), a random access memory (RAM) (not shown), input/output (I/O) elements (not shown), etc. Controller 21 may be a stand-alone unit, or alternatively, may be integrated within a portion of motor 20.

Controller 21 may be communicatively coupled to an external power source 25 and adapted to provide power to motor 20. Controller 21 may be coupled to external power source directly or through a power distribution module configured to supply power to one or more components of a component system. For example, controller 21 may be coupled to an alternator of a vehicle through electronic control unit 24 that may be configured to distribute at least a portion of the electric energy generated by the alternator. In this configuration, controller 21 may be indirectly coupled to power source 25. It is also contemplated that controller 21 be directly coupled to power source 25 via a second electric conductor 23.

Controller 21 may be configured to provide a power signal to motor 20. For example, controller 21 may receive power signals from power source 25 and directly transmit the signal to motor 20 over first electric conductor 22. Alternatively, controller 21 may be configured to manipulate the power signal (e.g., convert an AC power signal to a DC signal) before providing the power signal to motor 20.

Controller 21 may be configured to monitor one or more operational characteristics of motor 20 and control current flow to field conductors of motor 20 based on the monitored operational characteristics. For example, controller 21 may monitor the temperature, pressure, and/or flow rate of the cooling medium and determine if each of the monitored characteristics are within a desired range. If, for example, the monitored temperature is outside of a desired range, controller 21 may adjust the flow rate of cooling medium through cooling system 10 by changing the speed of motor 20. Speed control may be realized by modifying the instantaneous current flowing through one or more field conductors of motor 20. Increasing the current through the field conductors may change the angular velocity of the shaft of motor 20 resulting in an increased flow rate of cooling medium.

Controller 21 may be configured to provide power and switching control signals to motor 20 over a common interface. In one embodiment, controller 21 may be configured with communication circuitry for integrating multiple signals onto a common interface. For example, controller 21 may provide a power signal to motor 20 over the common interface at a suitable frequency for efficient power transfer, typically at fundamental frequencies between DC and a few hundred hertz (e.g., AC signals at 60 Hz) while transmitting switching control signals at a higher frequency appropriate for fast, efficient data transfer (e.g., kilohertz range, megahertz range, gigahertz range, etc.) Alternatively, controller 21 may provide portions of a power signal periodically, using a series of electrical switches. In this embodiment, power signals, in the form of direct current supplied to motor, may be divided into current pulses using electronic switches. As a result, control and data signals may be communicated over the common interface during switch cycles where no switching activity is present over the interface.

Controller 21 may be configured to determine a time period for data communication to motor 20 by monitoring the electrical switch cycles for the power signal. The determined time period for data communication may be based on the switch speed of the electronic switches. For example, controller 21 may determine a switch speed required to maintain a desired angular velocity of a shaft associated with motor 20. Controller 21 may determine a communication time period associated with the portion of the switch cycle where no power signal is provided to motor 20. Controller 21 may communicate data and control signals during the determined communication time period.

Controller 21 may be communicatively coupled to motor 20 and configured to receive data and/or control information from motor 20. For example, controller 21 may include a transmitter (not shown), receiver (not shown), modulation and demodulation circuitry (not shown), and/or one or more multiplexers (not shown) for manipulating the data and control signalization into various frequency and/or time-domain waveforms for efficient data transfer.

An electronic drive 26 may be communicatively coupled to motor 20 and operable to provide power signalization to motor 20 over power wiring. For example, electronic drive 26 may embody a switching circuit for a brushless DC motor which, when active, provides a predetermined current to one or more field conductors to operate motor 20. Electronic drive 26 may be operable to provide direct current power signals or alternating current power signals. Furthermore, because electronic drive 26 may contain one or more switching elements, it is contemplated that alternating current power signals may be broken into discrete segments of varying power levels and pulse widths.

In one embodiment, electronic drive 26 may be communicatively coupled to controller 21 and adapted for selective coupling of motor 20 and controller 21 to provide control signals to motor 20 over the power wiring. For example, controller 21 may determine a time period for data communication and selectively couple controller 21 to motor 20. This selective coupling may provide a signal flow path for transmitting control signals to motor 20 over the power wiring.

Electronic drive 26 may be configured to provide positional feedback of a rotor associated with the motor for determining the timing of the energizing sequence. For example, electronic drive 26 may include a circuit and/or logic algorithm for monitoring the position of the rotor associated with the motor, and communicate the monitored position information to controller 21.

First electric conductor 22 may communicatively couple controller 21 to motor 20 and a power source 25. First electric conductor 22 may be designed as the primary medium of power control and data signalization between controller 21 and motor 20. First electric conductor 22 may include a metallic wire, a conductive trace, a power bus, or any other device known in the art for conduction of an electric signal. Furthermore, it is contemplated that first electric conductor 22 may include a medium operable to conduct an electric signal covering a multitude of frequency ranges, with substantially low attenuation over the frequency ranges. Although first electric conductor 22 is illustrated as a single conductor, it is contemplated that first electric conductor 22 includes one or more conductors.

Likewise, second electric conductor 23 may be communicatively coupled to controller 21, and may be adapted as the primary medium of power control and data signalization to one or more components external to electric motor control system 13 such as, for example, power source 25, an electronic control unit 24, a master controller, a data analyzer, a diagnostic system, a computer, and/or any other device adapted to communicate power and/or data signals. Second electric conductor 23 may include a metallic wire, a conductive trace, a power bus, or any other device known in the art for conduction of an electric signal. Furthermore, it is contemplated that first electric conductor 22 may include a medium operable to conduct an electric signal covering a multitude of frequency ranges, with substantially low attenuation over the frequency ranges. Although second electric conductor 23 is illustrated as a single conductor, it is contemplated that second electric conductor 23 includes one or more conductors.

Figure 2:
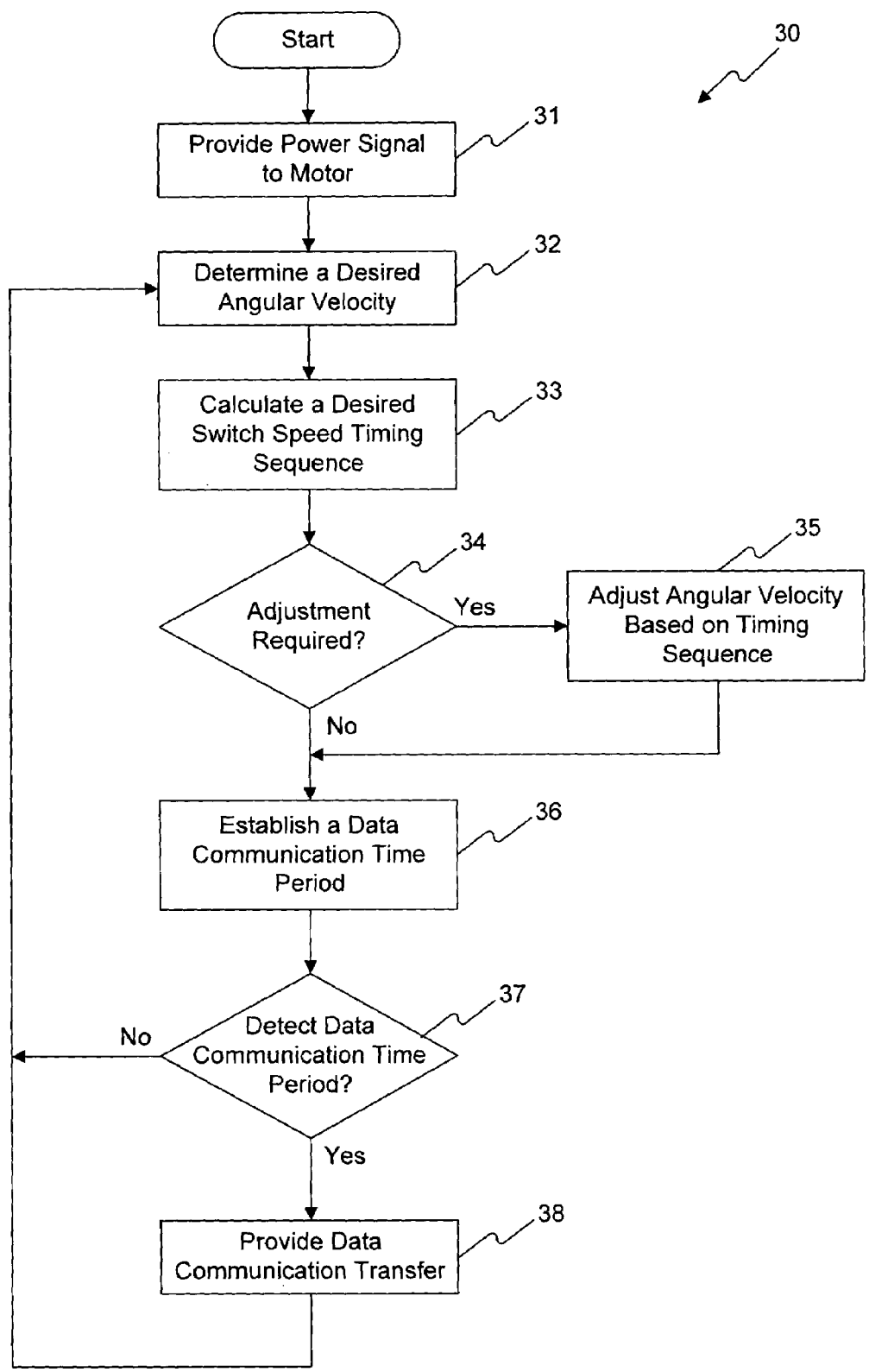
FIG. 2 illustrates a flowchart depicting an exemplary disclosed method for operating the cooling system of FIG. 1.

FIG. 2 illustrates an exemplary disclosed method of operating cooling system 10. FIG. 2 will be discussed in the following section to further illustrate the disclosed system and its operation.

INDUSTRIAL APPLICABILITY

The disclosed control system may be applicable to any system where a simple, compact, electrically driven actuator may be advantageous. Specifically, the disclosed control system may provide an efficiently cooled, electrically driven actuator that includes minimal wiring. The operation of electric motor control system 13 will now be described in detail.

As illustrated in flowchart 30 of FIG. 2, the operation of electric motor control system 13 may be initiated when a power signal is provided to motor 20 (Step 31). For example, the power provided to motor 20 may rotate an output shaft of the motor to move actuator 19, which may then pressurize the cooling medium for distribution throughout cooling circuit 12. The initial angular velocity, shaft speed, and/or pressure of cooling system 10 may be predetermined based on one or more initial conditions of cooling system 10. The power may be provided by external power source 25 via first electric conductor 22. Alternatively, power may be provided by an external power source 25 to controller 21 via second electric conductor 23 and then subsequently provided to motor 20 via first electric conductor 22.

Once motor 20 is operational, the desired angular velocity of the shaft of motor 20 may be modified based upon one or more operational characteristics of motor 20 and/or cooling system 10 (Step 32). For example, an elevated temperature of the cooling medium may indicate that the flow rate of cooling system 10 is insufficient for maintaining a desired ambient temperature of one or more mechanical devices coupled to cooling system 10. As a result, controller 21 may determine that the angular velocity of the shaft of motor 20 should be increased to increase the flow of the cooling medium.

In order to change the angular velocity of the shaft of motor 20, it may be necessary to vary the electromagnetic field generated by the current flowing in the field conductors of motor 20. Controller 21 may calculate a switch speed timing sequence to determine the speed and sequence of switching required to provide a current to generate the desired angular velocity (Step 33). For example, a particular angular velocity of the shaft of motor 20 may correspond to an electromagnetic field associated with a particular current through the field conductors of the stator of motor 20. Using electronic switches, the current provided to the field conductors may be manipulated to control the electromagnetic field, thereby providing a desired angular velocity.

Controller 21 may determine that an adjustment of the timing sequence of the electronic switches may be needed to provide the desired angular velocity (Step 34). If it is determined that an adjustment of the timing sequence is required, controller 21 may provide a control signal to electronic drive 26 to modify the switching sequence in order to supply the desired angular velocity (Step 35). For example, a switch sequence for a series wound DC motor may require that a 1 microsecond/revolution switch speed be maintained in order to supply the appropriate current to the field conductors to correspond to the desired angular velocity. If the present switch speed is 1.2 microseconds/revolution, controller 21 may provide a control signal to electronic drive 26 to modify the switch speed in response to the calculated timing sequence.

Upon adjustment of the switch speed timing sequence, if required, a data communication time period may be established, based on the current timing sequence (Step 36). For example, if the current switch speed is 1 microsecond/revolution, and a revolution takes 2 microseconds, then there may be a time period where current is not flowing to motor 20. This time period, for example, may be designated as the data communication time period, and, because no transition event associated with the switch is occurring during this time period, interference of the data signals from the power signals may be reduced.

Once the data communication time period has been established, controller 21 may monitor and detect the time period using a variety of different methods (Step 37). For example, controller 21 may store the latest timing sequences in memory and actively track the data communication time period based on the position of the shaft of motor 20. Alternatively, controller 21 may receive feedback signals from electronic drive 26 to detect a data communication time period. If the data collection time period is not detected in a predetermined amount of time, the process may repeat from the determination of the desired angular velocity (Step 31).

Upon detection of a data communication time period, controller 21 may provide data communication transfer to motor 20 (Step 38). For example, external electronic control unit 24 may provide an indication to controller 21 via second electric conductor 23 requesting an increase in the flow rate of the cooling medium through cooling circuit 12 based on the operation of cooling system 10. Controller 21 may provide a control signal indicating a desired increase in angular velocity to motor 20 over first electric conductor 22 during the next data communication time period.

The presently disclosed motor control system may have several advantages depending upon the embodiment implemented. For example, because data and power signals may be provided over a common connection, fewer wires may be required for power and control signalization of motor 20. The reduced number of wires may reduce the costs of electric motor control system 13. Furthermore, the reliability of electric motor control system 13 may be increased by the reduction of the number of electrical conductors, particularly within the housing where high pressure and elevated moisture levels may increase the likelihood of electrical problems or, potential failure of electric motor control system 13.

Furthermore, because electric motor control system 13 may be configured to communicate data and power signals over power wiring, fewer conductors may be required to provide external connectivity to electric motor control system 13. The transfer of data signals along power wiring can reduce the risk associated with multiple connections exiting housing 18 such as, for example, electrical and magnetic interference associated with multiple signal-carrying lines. Furthermore, in addition to reduced electromagnetic emissions, fewer connections may result in improved waterproofing over systems with multiple conductors exiting a housing. As a result, loss of the cooling medium associated with leakage may be substantially reduced, resulting in lower maintenance and repair costs.

It will be apparent to those skilled in the art that various modifications and variations can be made to the disclosed electric motor control system without departing from the scope of the invention. Other embodiments of the present disclosure will be apparent to those skilled in the art from consideration of the specification and practice of the present disclosure. It is intended that the specification and examples be considered as exemplary only, with a true scope of the present disclosure being indicated by the following claims and their equivalents.

What is claimed is:

1. An electric motor control system, comprising:
a housing;
a motor disposed within the housing;
an actuator operatively coupled to the motor and configured to operate in response to an operation of the motor;
a controller disposed within the housing and communicatively coupled to the motor; and
a first electric conductor communicatively coupling the motor to the controller;
wherein the controller is configured to:
periodically provide a power signal to the motor over the first electric conductor; and
receive data indicative of a position of the rotor via the first electric conductor during a time period when the power signal is not provided over the first electric conductor.

2. The control system of claim 1, wherein the actuator includes an impeller adapted to pressurize a cooling medium.

3. The control system of claim 1, wherein the actuator includes a fan adapted to rotate relative to the motor.

4. The control system of claim 1, wherein the controller is further configured to control at least one operational aspect of the motor.

5. The control system of claim 1, further including a second electric conductor communicatively coupling the controller to an electronic control unit external to the housing.

6. The control system of claim 5, wherein the controller is configured to:
transmit a signal indicative of an operational aspect of the motor over the second electric conductor;
receive a control signal to regulate an operation of the motor over the second electric conductor; and
receive a power signal over the second electric conductor.

7. The control system of claim 1, wherein the controller further includes an electronic drive adapted to provide power over the first electric conductor.

8. The control system of claim 7, wherein the electronic drive is configured to sequentially energize a plurality of field conductors of the motor.

9. The control system of claim 8, wherein the controller is further configured to:
determine a timing of an energizing sequence associated with the electronic drive;
communicate the data signal over the first electric conductor based upon the timing.

10. The control system of claim 9, wherein the electronic drive is further configured to provide positional feedback of a rotor associated with the motor for determining the timing of the energizing sequence.

11. A method for operating a motor, the method comprising:
periodically providing, with a controller disposed within a housing associated with the motor, an electric power signal to the motor over a first electric conductor;
receiving, with the controller, data indicative of a position of a rotor of the motor via the first electric conductor during a time period when the power signal is not provided over the first electric conductor; and
adjusting at least one operational aspect of the motor in response to the received data.

12. The method of claim 11, further including:
determining a desired angular velocity of a rotor of the motor;
calculating a switch speed based upon the desired angular velocity; and
establishing the time period for data communication based on the switch speed.

13. The method of claim 12, further including transmitting a control signal to the motor over the first electric conductor substantially during the established time period.

14. The method of claim 13, wherein establishing the time period includes:
monitoring an electric power signal in a field conductor of the motor;
monitoring the switch speed;
adjusting the time period for data communication based on the monitored power signal and switch speed.

15. The method of claim 14, further including transmitting a control signal to the motor over the first electric conductor substantially during the established time period.

16. A cooling system, comprising:
a source of cooling medium;
a cooling circuit in fluid communication with the source of cooling medium;
an electric motor control system, comprising:
a housing;
a motor disposed within the housing;
an actuator operatively coupled to the motor and configured to operate in response to an operation of the motor;
a controller disposed within the housing and communicatively coupled to the motor; and
a first electric conductor communicatively coupling the motor to the controller;
wherein the controller is configured to:
periodically provide a power signal to the motor over the first electric conductor; and
receive data indicative of a position of the rotor over the first electric conductor during a time period when the power signal is not provided to the motor over the first electric conductor.

17. The cooling system of claim 16, further including a second electric conductor communicatively coupling the controller to an electronic control unit external to the housing.

18. The cooling system of claim 17, wherein the controller is configured to:
transmit a signal indicative of an operational aspect of the electric motor control system over the second electric conductor;
receive a control signal to regulate an operation of the electric motor control system over the second electric conductor; and
receive a power signal over the second electric conductor.

19. The cooling system of claim 18, wherein the controller further includes an electronic drive adapted to provide power over the first electric conductor.

20. The cooling system of claim 19, wherein the electronic drive is configured to sequentially energize a plurality of field conductors of the motor.

21. The cooling system of claim 20, wherein the controller is further configured to:
determine a timing of an energizing sequence associated with the electronic drive;
communicate the data signal over the first electric conductor based upon the timing.

22. The cooling system of claim 21, wherein the electronic drive is further configured to provide positional feedback of a rotor associated with the motor for determining the timing of the energizing sequence.

23. The method of claim 1, wherein the controller is further configured to:
calculate a switch speed based upon a desired angular velocity and the received data indicative of a position of a rotor;
establish a time period for data communication via the first electric conductor based on the switch speed; and
monitoring an operational characteristic of the motor via the first electric conductor during the established time period.

24. The system of claim 16, wherein the actuator includes an impeller configured to circulate the cooling medium through the cooling circuit, wherein the controller is further configured to:
receive data indicative of one or more of temperature, pressure, or flow rate of the cooling medium via the first electric conductor during the time period when the power signal is not provided over the first electric conductor; and
adjust at least one operational aspect of the motor in response to the received data.

* * * * *